May 18, 1948. W. M. CRUMP 2,441,798
POWER TAKE-OFF FOR TRACTORS
Filed March 31, 1947 2 Sheets-Sheet 1
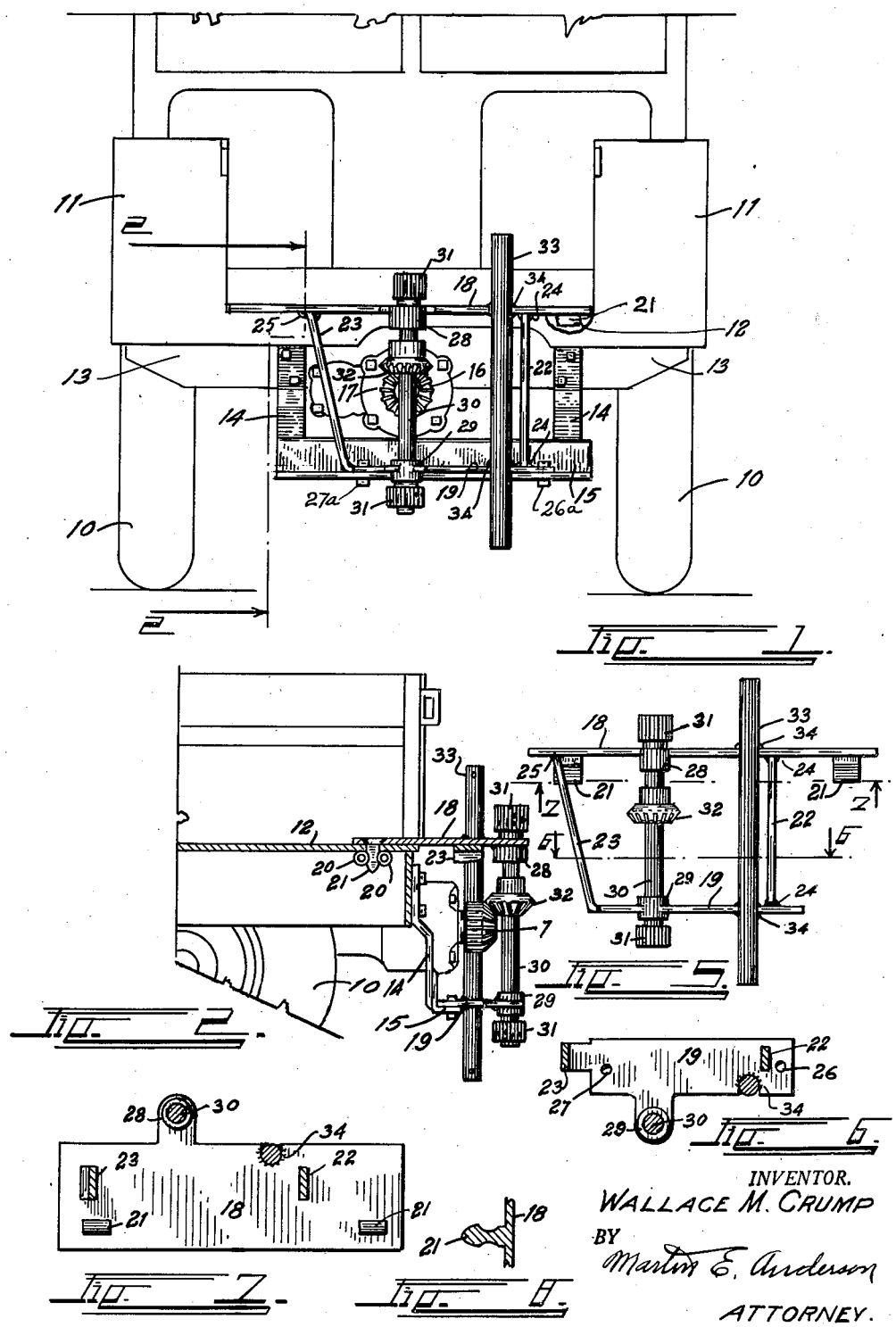
INVENTOR.
WALLACE M. CRUMP
BY
Martin E. Anderson
ATTORNEY.

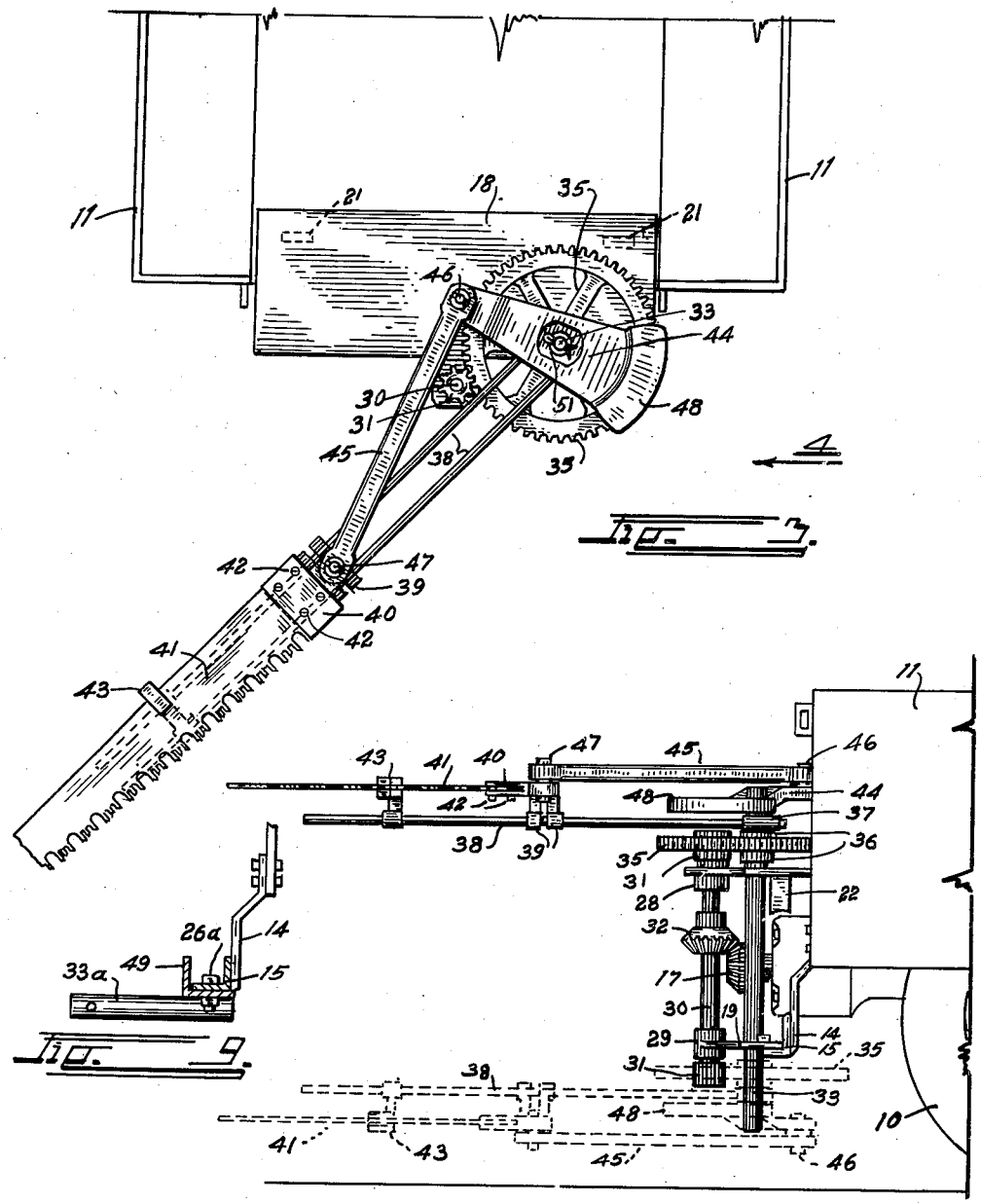

Patented May 18, 1948

2,441,798

UNITED STATES PATENT OFFICE 2,441,798

POWER TAKE-OFF FOR TRACTORS

Wallace M. Crump, Denver, Colo.

Application March 31, 1947, Serial No. 738,393

4 Claims. (Cl. 74—11)

1

This invention relates to improvements in power take-offs for tractors having a rearwardly extending power take-off shafts.

There is on the market today a combined automobile and tractor that is sold under the name of "jeep" which is designed and well adapted for operating various kinds of auxiliary tools. This tractor is provided at the rear end with a power take-off shaft whose direction and speed of rotation can be regulated by a system of gearing that forms part of the tractor.

It is the object of this invention to produce an attachment designed more particularly for this automobile tractor, that can be readily attached to the rear end thereof and operatively connected with the power take-off shaft in such a way that power from the horizontal shaft is transferred to a vertical shaft that is rotatably connected with the attachment and from which the power may be transferred to a mechanism connected with a stationary shaft secured to the attachment and mounted in spaced parallel relation with the rotatable shaft.

It is an object of this invention to produce a power take-off attachment of a very simple and rugged construction that can be quickly placed in operative position and attached to the tractor by means of two bolts.

Another object of the invention is to produce an attachment of such construction that it can be used for the operation of a reciprocating drag saw of old and well known construction.

Another object of the invention is to produce an attachment that can be used for driving any type of machine that can be more readily operated from a vertical shaft than from the horizontal take-off shaft of the tractor and which makes it possible, by shifting a pinion, to change the gear ratio between the power take-off shaft of the tractor and the operating gear.

The above and any other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 1 is a rear elevation of the automobile tractor showing the attachment in place thereon;

Figure 2 is a side elevation taken on line 2—2, Figure 1;

Figure 3 is a top plan view of the tractor and the attachment showing a drag saw of usual construction positioned thereon in operative engagement with the power take-off;

Figure 4 is a side elevation looking in the direction of arrow 4, in Figure 3;

Figure 5 is a rear elevation of the attachment showing the same removed from the tractor;

Figure 6 is a section taken on line 6—6, Figure 5;

Figure 7 is a section taken on line 7—7, Figure 5;

Figure 8 is a section taken on line 8—8, Figure 7; and

Figure 9 is a fragmentary sectional view showing a horizontal shaft attached to the drawbar.

In the drawing reference numeral 10 designates the rear wheels of the automobile tractor, reference numeral 11 designates the ordinary fenders, reference numeral 12 designates the floor of the automobile body. A transverse frame member has been designated by reference numeral 13 and suspended from this by means of bars 14 is an angle iron 15 that forms a permanent part of the automobile tractor and which is provided on its horizontal flange with a plurality of openings which have not been shown in the drawing but which are employed for connecting the attachment to the tractor.

The tractor has a power take-off shaft that has been designated by reference numeral 16. This power take-off of shaft is positioned adjacent the center line of the tractor and has been shown as terminating in a bevel pinion 17.

The power take-off attachment to which this invention relates comprises two parallel plates arranged in spaced vertical relation. The upper plate has been designated by reference numeral 18 and the lower plate by reference numeral 19. Plate 18 is wider than plate 19 and overlaps the floor of the automobile tractor in a manner shown in Figure 2. This particular make of tractor is provided near the rear end of the floor with openings having springs or rollers 20 on opposite sides thereof. These openings and springs are used in connection with the rear seat when the tractor is used for transporting passengers. Plate 18 is provided with downwardly extending pins 21 that project through the holes in the floor and extend between the springs 20. Plate 19 is spaced from plate 18 such a distance that it will rest on the upper surface of the horizontal flange of angle iron 15, as shown in Figures 1 and 2. Plates 18 and 19 are secured together and held in a fixed spaced relation by means of bars 22 and 23. Bar 23 is welded at its ends to the plates as shown at 24. Bar 23 is formed integral with plate 19 and extends upwardly at an outwardly inclined angle and is welded to the under surface of plate 18 as indicated at 25. Plate 19 is provided with holes 26 and 27 for the reception of bolts 26a and 27a, respectively, by means of which the attachment is rigidly connected with angle iron 15 as shown in Figure 1. Bolts 26a and 27a are parts of the tractor and are normally employed to hold an attaching device in place on the angle. This must be removed when this attachment is applied and the bolts can therefore be employed for the purpose shown.

Two bearings 28 and 29 are connected with the assembly just described, bearing 28 being connected with plate 18 and bearing 29 with plate 19. These bearings are positioned in axial alignment and so related to the axis of shaft 16 that the two axes intersect at right angles. A shaft 30 is mounted for rotation in bearings 28 and 29 and is provided at opposite ends with spur pinions 31 which also serve as stops, limiting longitudinal movement. Between bearings 28 and 29 a bevel gear pinion 32 is positioned. This is secured in such position that it will mesh with bevel gear 17 on shaft 16, the parts being in the position shown in Figure 2.

A stationary shaft 33 is secured to plates 18 and 19 by welding, as indicated at 34. Shaft 33 is positioned with its axis parallel to the axis of shaft 30.

Referring now to Figures 3 and 4 where the saw has been shown in operative relation to the power take-off that has just been described, it will be observed that the saw assembly comprises a large spur gear 35 having a central opening for the reception of shaft 33. Spur gear 35 is provided with a hub that extends outwardly from opposite sides thereof and which has been designated by reference numeral 36. A casting 37 is mounted for rotation on the end of the hub, as shown in Figure 4 and carries two guide rods 38. A crosshead comprising the parts designated by reference numeral 39 is slidably mounted on the guide rods 38. Crosshead 39 carries a member 40 to which a saw blade 41 is connected by means of bolts or screws 42. A guide 43 is connected with the outer ends of guide rods 38 as shown in Figure 4. This guide has a notch that receives the saw and serves as a means for exerting a downward pressure on the saw during operation. Secured to the upwardly extending hub 36 is a crank arm 44 to whose outer end a connecting rod 45 is attached by means of a pivot 46. The other end of the connecting rod is connected with the crosshead by means of a pivot 47. The crank arm is counterbalanced by means of a weight 48. The saw construction that has been illustrated and which has just been described is old and well known, having been marketed in the form shown for many years, and applicant therefore claims no novelty, so far as the saw is concerned. The saw has merely been shown on the drawing for the purpose of better disclosing the function of his power take-off attachment and the manner in which it is connected with the saw.

In the drawing the saw mechanism has been shown in full lines in Figures 3 and 4, as attached to the upper end of shaft 33. This is the position which the saw occupies when cutting down a large tree some distance from the ground. In cases where the saw cut is to be made closer to the ground, the saw is applied to the lower end of the shaft 33, as shown by broken lines in Figure 4.

It will be observed from Figure 3 that spur gear 35 is in operative mesh with pinion 31 and therefore whenever shaft 16 rotates it imparts a corresponding rotation to gear 17, shaft 31 will be rotated and this, in turn, will transmit rotary motion to spur gear 35 by means of pinion 31. When spur gear 35 rotates, it carries with it the crank arm and produces a reciprocating motion of the saw. When the saw is operating, pressure can be exerted on guide 43 so as to urge the saw against the bottom of the kerf.

After a tree has been felled and is to be cut into suitable lengths, it will be necessary to change the position of the saw so that spur gear 35 will rotate about a horizontal shaft. When this is to be done, the power take-off attachment that has just been described is removed and replaced by an angle iron 49 that is connected with angle iron 15 by means of the two bolts 26a and 27a. A shaft 33a is welded to the horizontal flange of angle iron 49 and sprocket wheel 35 is mounted on this shaft. When spur gear 35 is mounted on shaft 33a, it meshes with a spur pinion 50 that is formed integral with the bevel pinion 17. The saw will now be positioned with the blade in a vertical plane.

From the above description it will be seen that the tractor can readily be adapted for the operation of a drag saw, of the type shown and described, by merely attaching to the tractor the power take-off mechanism illustrated in the drawing and shown more particularly in Figures 2, 5, 6 and 7. This attachment or power take-off is of a simple construction and it can be quickly attached and removed. The attachment is secured to the tractor by placing plate 18 on top of the floor with pins 21 projecting into the openings in the floor, in which position plate 19 will rest on the upper surface of the horizontal flange of angle iron 15. By inserting bolts 26a and 27a as shown in Figure 1, the attachment is firmly secured in place. The saw can then be secured to the upper or to the lower end of shaft 33 and held in position by suitable means such as a cotter pin 51.

When the saw is transported, the blade can be separated from the crosshead and the other parts turned inwardly in such a position that they will rest on the floor of the tractor.

This simple attachment that can be manufactured at a comparatively low price, and makes it possible to convert the type of tractor shown, into a power apparatus for operating drag saws so as to make horizontal or vertical cuts.

Having thus described the invention, what is claimed as new is:

1. As an article of manufacture, a power take-off attachment for tractors, comprising two plates of unequal width, means for interconnecting the plates in spaced parallel relation comprising spaced bars, bearings secured to corresponding edges of the plates in axial alignment, the axis being substantially perpendicular to the planes of the plates, a shaft in the bearings, spur pinions on the ends of the shaft adjacent the bearings, the pinions forming stops limiting axial movement of the shaft, a bevel gear secured to the shaft at a point between the bearings, and a stationary shaft of greater length than the distance between the plates, secured to the plates in spaced, axially parallel relation to the first shaft, the ends of the stationary shaft projecting beyond the corresponding plates, the stationary shaft serving to rotatably support a spur gear in operative engagement with the corresponding spur pinion.

2. The combination with a tractor having a power take-off comprising a rearwardly extending shaft, a take-off attachment frame comprising two parallel plates, spacer bars interconnecting the plates in parallel relation, a bearing secured to each plate, in spaced axial alignment, a shaft journaled in the bearings, a spur pinion secured to each end of the shaft adjacent the bearings, forming stops limiting longitudinal movement of the shaft in the bearings, a bevel pinion secured to the shaft at a point between the bearings and a stationary shaft parallel with the first mentioned shaft, secured to the plates, the stationary shaft extending beyond the outer surfaces of the plates, whereby a spur gear may be mounted on either end, in operative engagement with the corresponding spur pinion on the first mentioned shaft.

3. A power take-off attachment for use with tractors having a rearwardly extending power shaft, a floor at some distance above the shaft, and a support member positioned below the shaft with its upper surface substantially parallel with the floor, said attachment comprising a plate adapted to lap the rear end of the floor, a narrower plate positioned below the first plate, means interconnecting the plates to hold them in such spaced relation that when the wider plate rests on the floor, the narrower plate will rest on the support members, means for interconnecting the wider plate with the floor and the narrower plate with the support member, bearings secured to the plates in vertical axial alignment, a shaft mounted in the bearings for rotary movement, the axis of the shaft being positioned to intersect the axis of the power shaft at right angles, spur pinions secured to the ends of the vertical shaft, adjacent the bearings, said pinions forming stops, limiting the axial movement of the shaft, a bevel gear secured to the shaft, between the bearings, and a stationary shaft secured to the plates in spaced axially parallel relation with the vertical shaft, the stationary shaft projecting above and below the plates, the ends of the stationary shaft serving as bearings for rotatably supporting a spur gear in operative engagement with a spur pinion.

4. As an article of manufacture, a power take-off attachment for tractors, comprising two plates of unequal width, means for interconnecting the plates in spaced parallel relation, comprising spaced bars, bearings secured to the plates in axial alignment, the axis being substantially perpendicular to the planes of the plates, a shaft mounted for rotation in the bearings, the ends of the shaft projecting beyond the plates at both ends, means for limiting endwise movement of the shaft, a bevel gear secured to the shaft at a point between the bearings, and means for attaching a power tool to the plates and the shaft, whereby it will be operated by power derived from the rotation of the shaft.

WALLACE M. CRUMP.

REFERENCES CITED

The following references are of record in the file of this patent:

UNITED STATES PATENTS

| Number | Name | Date |
| --- | --- | --- |
| 134,305 | North | Dec. 24, 1872 |
| 1,536,081 | Dean | May 5, 1925 |
| 1,761,209 | Hoerr | June 3, 1930 |